US008019229B2

(12) United States Patent
Fujiwara

(10) Patent No.: US 8,019,229 B2
(45) Date of Patent: Sep. 13, 2011

(54) APPARATUS, SYSTEM, METHOD, AND PROGRAM FOR VISIBLE LIGHT COMMUNICATION

(75) Inventor: Ryuhei Fujiwara, Tokyo (JP)

(73) Assignee: NEC Corporation (JP)

( * ) Notice: Subject to any disclaimer, the term of this patent is extended or adjusted under 35 U.S.C. 154(b) by 669 days.

(21) Appl. No.: 11/616,727

(22) Filed: Dec. 27, 2006

(65) Prior Publication Data
US 2007/0147843 A1 Jun. 28, 2007

(30) Foreign Application Priority Data

Dec. 27, 2005 (JP) ................................. 2005-376143

(51) Int. Cl.
H04B 10/00 (2006.01)
H04B 13/02 (2006.01)
G08B 5/00 (2006.01)
G08B 5/36 (2006.01)
G09G 3/32 (2006.01)

(52) U.S. Cl. ........ 398/172; 398/140; 398/106; 398/107; 398/108; 398/183; 340/815.65; 340/815.66; 340/815.67

(58) Field of Classification Search .................. 398/172, 398/140, 106–108; 340/815.65
See application file for complete search history.

(56) References Cited

U.S. PATENT DOCUMENTS

| | | | | |
|---|---|---|---|---|
| 6,167,199 A * | 12/2000 | Fukui | ............................... | 396/57 |
| 6,496,135 B1 * | 12/2002 | Darbee | ........................... | 341/173 |
| 6,690,003 B2 * | 2/2004 | Zak | ................................ | 250/221 |
| 6,897,624 B2 * | 5/2005 | Lys et al. | ....................... | 315/297 |
| 7,663,501 B2 * | 2/2010 | Hyun et al. | ............... | 340/815.65 |
| 2002/0033637 A1 * | 3/2002 | Fisher | ................................ | 303/20 |
| 2002/0109887 A1 * | 8/2002 | Aburakawa et al. | ........... | 359/172 |
| 2003/0236991 A1 * | 12/2003 | Letsinger | ....................... | 713/200 |
| 2004/0018839 A1 * | 1/2004 | Andric et al. | .................. | 455/433 |
| 2004/0116039 A1 * | 6/2004 | Mueller et al. | ................ | 446/220 |
| 2005/0265731 A1 * | 12/2005 | Keum et al. | .................... | 398/183 |
| 2006/0046810 A1 * | 3/2006 | Tabata | ............................... | 463/9 |
| 2006/0210278 A1 * | 9/2006 | Cregg et al. | .................... | 398/107 |
| 2006/0239689 A1 * | 10/2006 | Ashdown | ....................... | 398/130 |
| 2006/0256070 A1 * | 11/2006 | Moosavi et al. | .............. | 345/104 |

(Continued)

FOREIGN PATENT DOCUMENTS

JP 62-14835 1/1987

(Continued)

OTHER PUBLICATIONS

Ubiquitous Visible Light Communications described by Masao Nakagawa on pp. 351-359 of the Transactions on Communications of IEICE 2005, B vol. J-88-B No. 2.

(Continued)

*Primary Examiner* — Ken N Vanderpuye
*Assistant Examiner* — Oommen Jacob
(74) *Attorney, Agent, or Firm* — Ostrolenk Faber LLP

(57) ABSTRACT

A visible light communication apparatus enables an operator to visually recognize a communication state during visual light communication. The apparatus includes a light emitting section which emits visible light and which includes a modulator, a visible light emitter, a light emitting element and an emission control section which includes a controller and which controls an emission state of the visible light from the light emitting section. The apparatus controls the emission state according to the communication state. It is hence possible for the operator to visually perceive the communication state during the visible light communication.

17 Claims, 11 Drawing Sheets

U.S. PATENT DOCUMENTS

2007/0024571 A1 * 2/2007 Maniam et al. .............. 345/102

FOREIGN PATENT DOCUMENTS

| JP | 62-276932 | 12/1987 |
| JP | 2000-004238 | 1/2000 |
| JP | 2002-319901 | 10/2002 |
| JP | 2003-163633 | 6/2003 |
| JP | 2004-248128 | 9/2004 |
| JP | 2004248128 A * | 9/2004 |
| JP | 2005-218066 | 8/2005 |
| JP | 2005-260380 | 9/2005 |
| JP | 2005-269475 | 9/2005 |

OTHER PUBLICATIONS

Japanese Office Action dated Nov. 11, 2008 (with English translation of relevant parts.).

* cited by examiner

F I G. 1
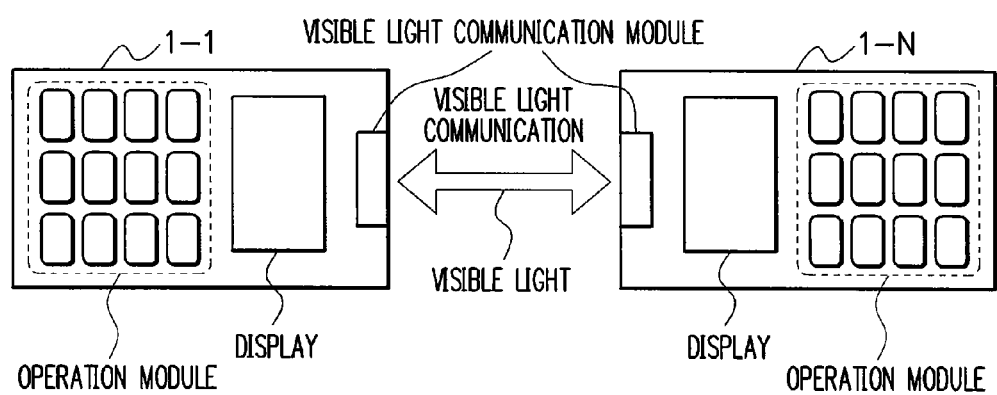

F I G. 3

| COMMUNICATION STATE | EMISSION STATE |
|---|---|
| STATE A | WITHOUT COLOR |
| STATE B | GREEN |
| STATE C | YELLOW |
| STATE D | RED |
| STATE E | WITHOUT COLOR |
| • | • |
| • | • |
| • | • |
| • | • |

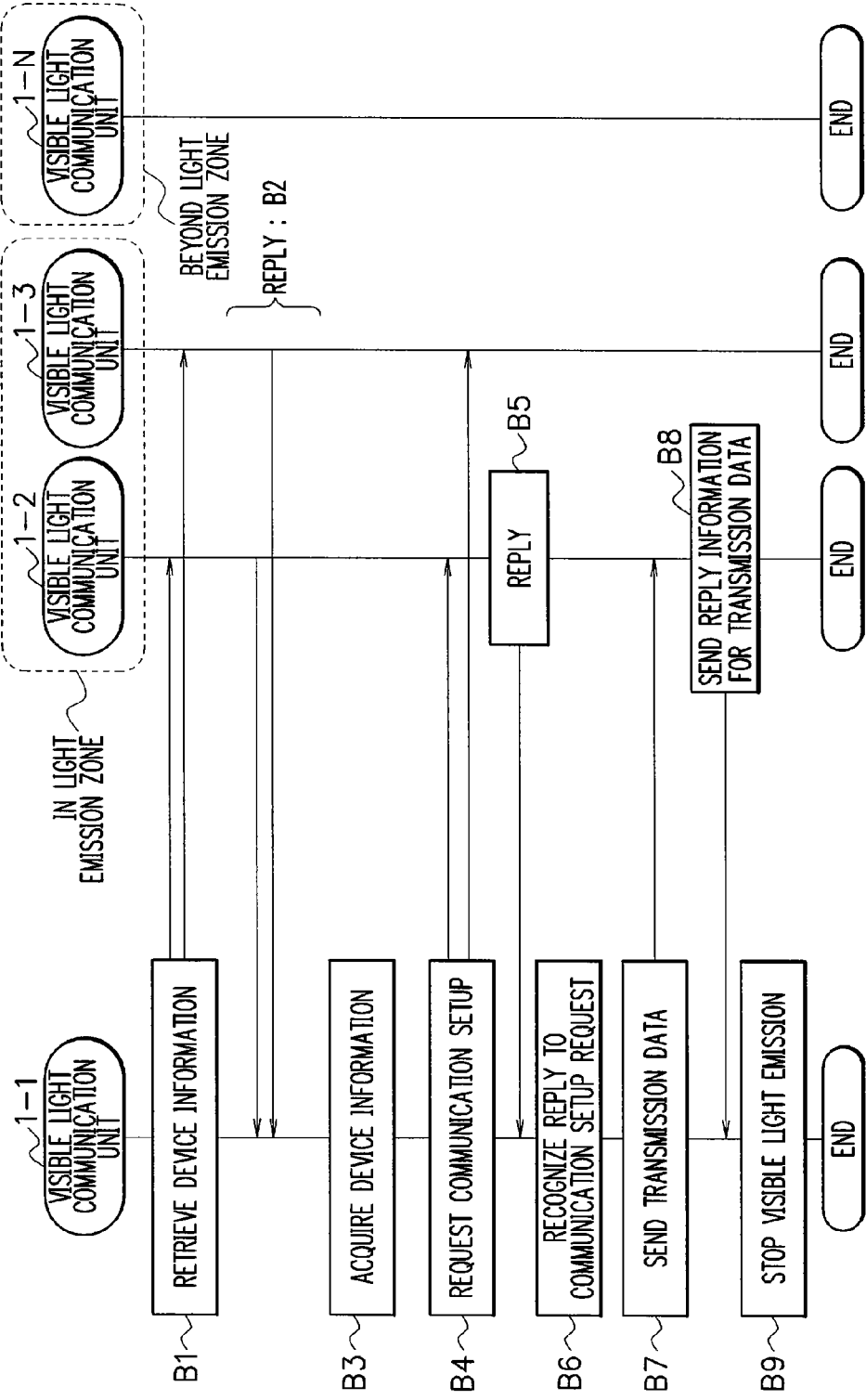

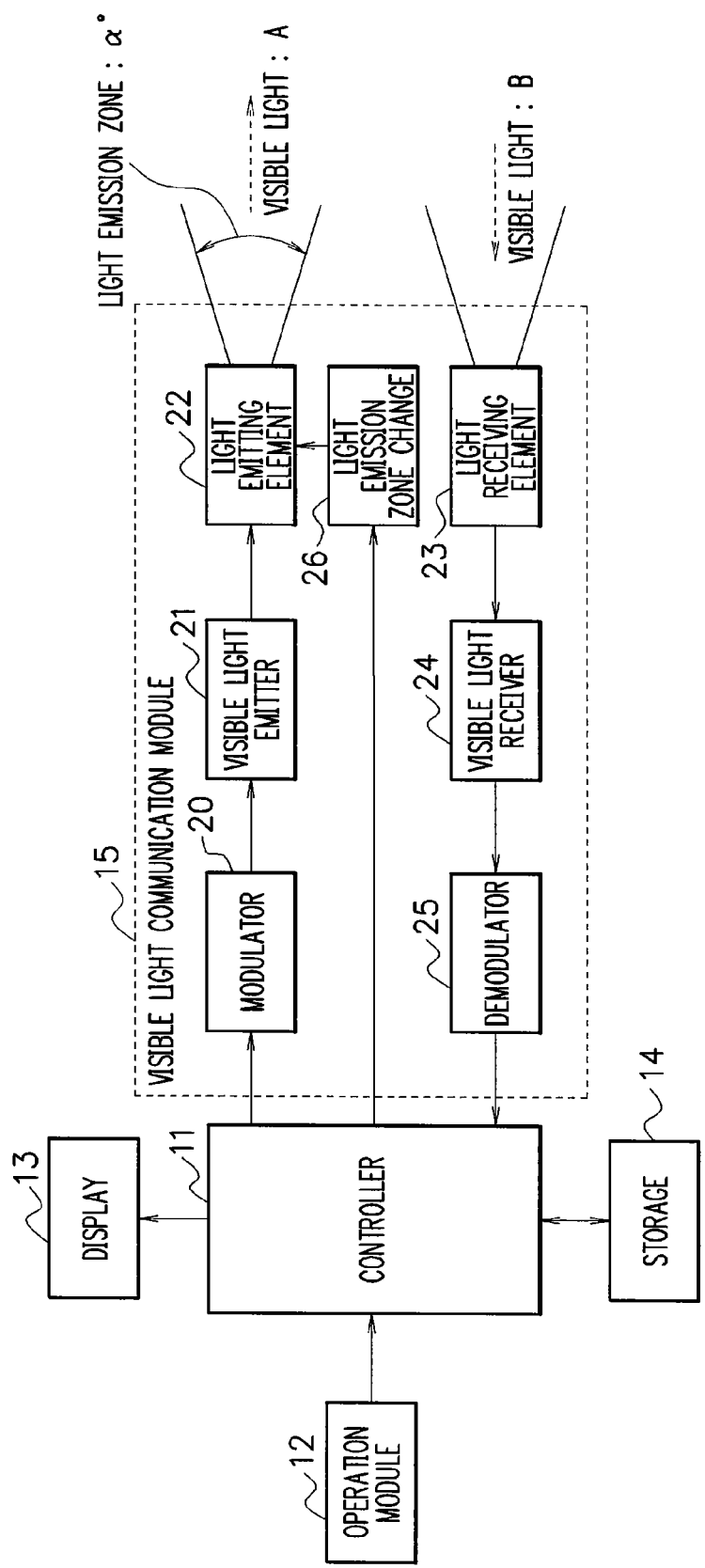

F I G. 9

| COMMUNICATION STATE | LIGHT EMISSION ZONE (α°) |
|---|---|
| STATE A | 120° |
| STATE B | 90° |
| STATE C | 60° |
| STATE D | 30° |
| STATE E | STRAIGHT LIGHT |
| • | • |
| • | • |
| • | • |
| • | • |

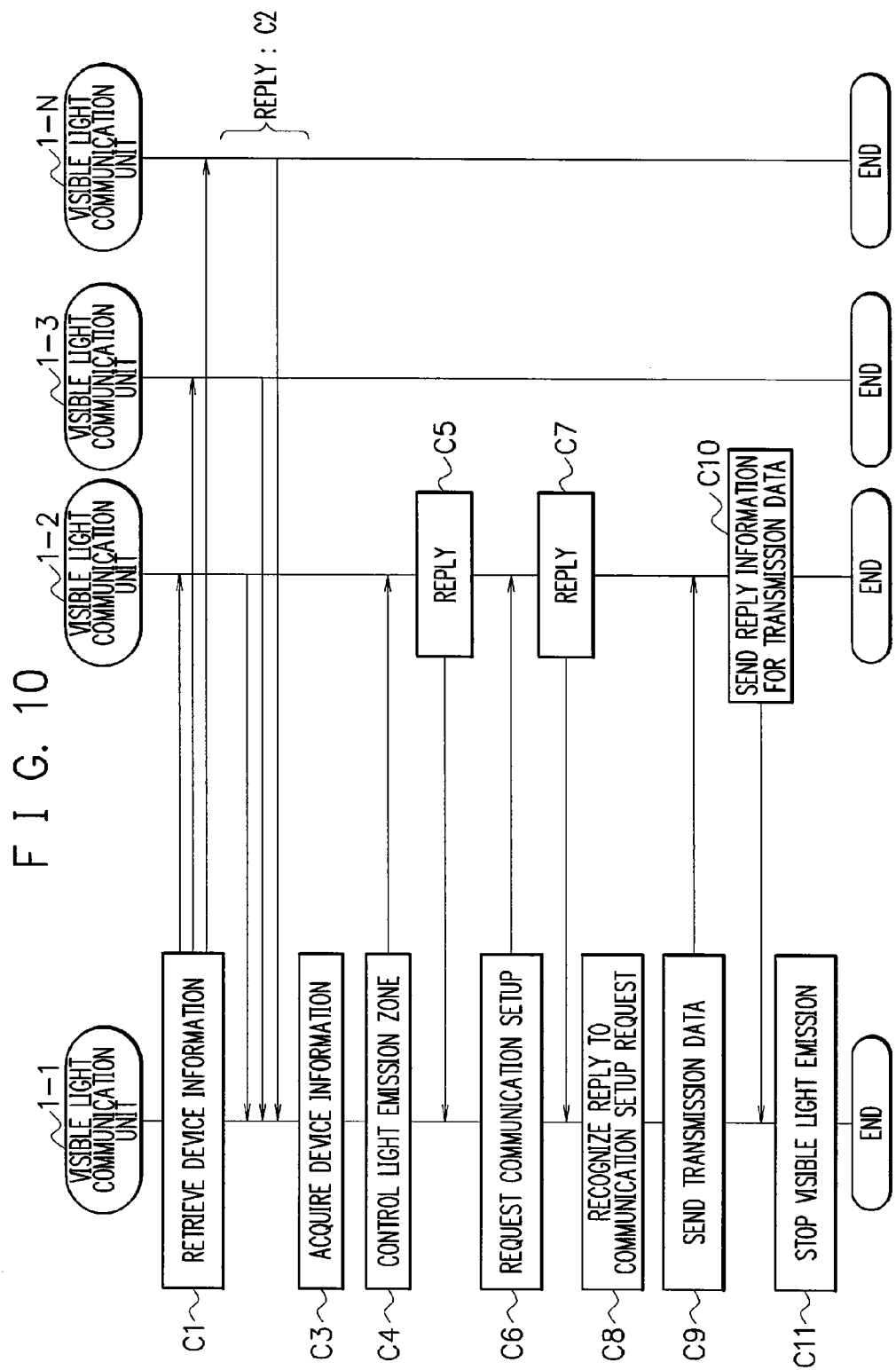

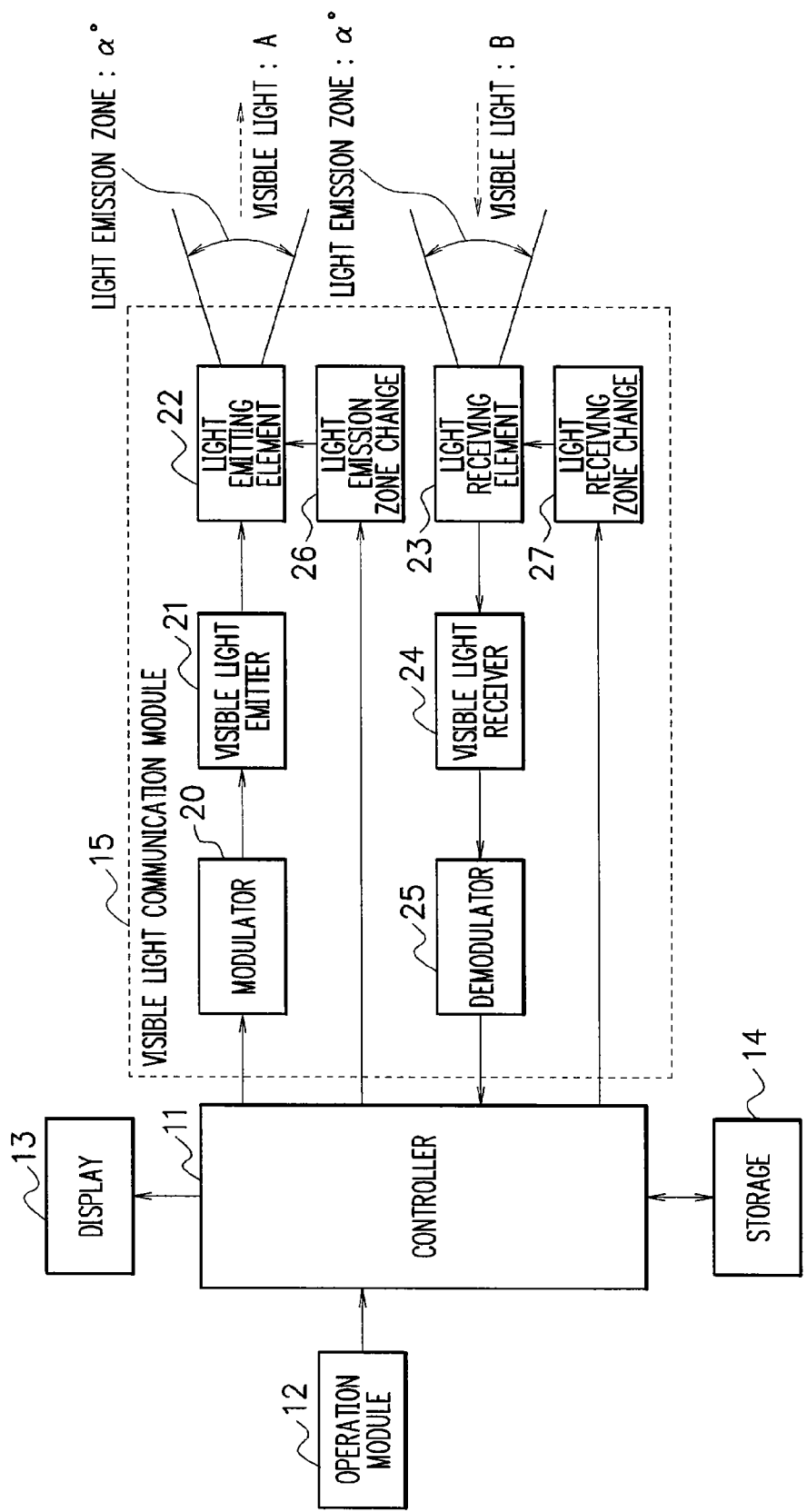

APPARATUS, SYSTEM, METHOD, AND PROGRAM FOR VISIBLE LIGHT COMMUNICATION

BACKGROUND OF THE INVENTION

1. Field of the Invention

The present invention relates to an apparatus, a system, a method, and a program for conducting communication of information by using visible light visible for human beings.

2. Description of the Related Art

In the conventional information communication, there have been employed infrared rays and radio waves invisible for the human beings for the following reasons. For example, there does not exist a light emitting device that radiates light with high efficiency, and the visible light is visually uncomfortable and/or visually troublesome for the human beings.

However, with visible light, the human can visually recognize an area or a zone in which the visible light can be received. Therefore, when compared with the infrared rays and the radio waves, the visible light is superior in usability and is more suitable for entertainment depending on purposes of the use thereof. The visible light is the same kind of wave as the radio waves and hence can transmit information.

Recently, as a light source for illumination, a Light Emitting Diode (LED) has rapidly come to broad use in place of the luminescent lamp and the light bulb. By blinking the LED at a high speed at which the blinking cannot be perceived by the human being, it is possible to transmit a large amount of data at an ultra high speed. Thanks to the information communication using the visible light, it is hence possible during the communication to remove various problems occurring in the radio communication and the infrared ray communication. That is, the ubiquitous, omnipresent and ultra high speed communication can be carried out without affecting human bodies and electronic devices.

The articles on techniques associated with and filed before the present invention include, for example, Japanese Patent Application Laid-Open No. 2005-218066 describing a positional information communication apparatus including a positional data section to generate positional information, a modulator section to modulate an electric signal on a power line according to the positional information from the positional data section, and an illumination section to emit illumination light using the electric signal obtained through the modulation. The apparatus communicates the positional information through optical wireless communication by use of illumination light, i.e., visible light.

In addition, Japanese Patent Application Laid-Open No. 2005-260380 describes a cellular phone terminal including a visible light receiving module and a visible light emitting module which are disposed side by side to face the same direction. The terminal carries out visible light communication so that the user visually perceives the visible light employed for the communication.

Additionally, various possibilities of the visible light communication have been described in, for example, "Ubiquitous Visible Light Communications" described by Masao Nakagawa on pages 351 to 359 of the Transactions on Communications of IEICE 2005, B Vol. J-88-B No. 2.

Although Japanese Patent Application Laid-Open Nos. 2005-218066 and 2005-260380 and "Ubiquitous Visible Light Communications" describe the visible light communication to communicate information using visible light including information, consideration has not been given to an operation to control the light emission state of the visible light depending on the communication state.

That is, according to the technique described in these articles, it is not considered that one of the features of the visible light, namely, "visibility, is efficiently utilized.

SUMMARY OF THE INVENTION

It is therefore an object of the present invention, which has been devised to remove the problems, to provide an apparatus, a system, a method, and a program for visible light communications in which the visible light having the feature of "visibility" is efficiently used in a communication process so that the communication state during the visible light communication is visually recognized.

The object will be achieved according to the following aspects of the present invention.

In accordance with one aspect of the present embodiments, there is provided a visible light communication apparatus for conducting information communication using visible light including a light emitting section for emitting the visible light and an emission controller for controlling an emission state of the visible light emitted from the light emitting section, according to a communication state.

The visible light communication apparatus further includes an emission zone controller for controlling an emission zone of the visible light emitted from the light emitting section, according to the communication state.

The visible light communication apparatus further includes a control table for controlling the communication state and the emission state with a correspondence established therebetween. The emission controller detects the communication state, refers to the control table according to the communication state thus detected, and controls the emission state of the visible light emitted from the light emitting section to be an emission state corresponding to the communication state.

In the visible light communication apparatus, the communication state is a communication state requiring human intervention to conduct information communication using visible light.

In the visible light communication apparatus, the communication state is at least one selected from the states including a communication process to be established between the visible light communication apparatus and devices communicable therewith, a number of the devices communicable with the communication apparatus, a type of devices communicable with the communication apparatus, a kind of communication to be established between the communication apparatus and the devices communicable therewith, a transmission rate to be established between communication apparatus and devices communicable therewith, a remaining amount of information to be sent to the devices communicable with the communication apparatus, an error rate in the communication established between the communication apparatus and devices communicable therewith, and a type of an application to be used when the communication is established between communication apparatus and devices communicable therewith.

The visible light communication apparatus further includes an emission synchronizer for synchronizing the emission state of the visible light of the visible light communication apparatus with that of a device communicable therewith according to the state of a communication process established therebetween.

In the visible light communication apparatus, the emission state is one selected from the states including a color of the visible light, a quantity thereof, and flashing thereof.

In accordance with one aspect of the present embodiments, there is provided a visible light communication system including a plurality of visible light communication apparatuses including a light emitting section for emitting visible light, the system conducting information communication between the communication apparatuses using the visible light. Each of the visible light communication apparatuses includes an emission controller for controlling an emission state of the visible light emitted from the light emitting section, according to a communication state.

In the visible light communication system, the visible light communication apparatus further includes an emission zone controller for controlling an emission zone of the visible light emitted from the light emitting section, according to the communication state.

In the visible light communication system, the visible light communication apparatus further includes a control table for controlling the communication state and the emission state with a correspondence established therebetween, and the emission controller detects the communication state, refers to the control table according to the communication state thus detected, and controls the emission state of the visible light emitted from the light emitting section to be an emission state corresponding to the communication state.

In the visible light communication system, the communication state is a communication state requiring human intervention to conduct information communication using visible light.

In the visible light communication system, the communication state is at least one selected from the states including a communication process to be established between the visible light communication apparatus and devices communicable therewith, a number of the devices communicable with the communication apparatus, a type of devices communicable with the communication apparatus, a kind of communication to be established between the communication apparatus and the devices communicable therewith, a transmission rate to be established between communication apparatus and devices communicable therewith, a remaining amount of information to be sent to the devices communicable with the communication apparatus, an error rate in the communication established between the communication apparatus and devices communicable therewith, and a type of an application to be used when the communication is established between communication apparatus and devices communicable therewith.

In the visible light communication system, the visible light communication apparatus further includes an emission synchronizer for synchronizing the emission state of the visible light of the visible light communication apparatus with that of a device communicable therewith according to the state of a communication process established therebetween.

In the visible light communication system, the emission state is one selected from the states including a color of the visible light, a quantity thereof, and flashing thereof.

In accordance with one aspect of the present embodiments, there is provided a visible light communication method for use with a visible light communication apparatus including a light emitting section for emitting visible light, the apparatus conducting information communication using the visible light. The method includes a step of controlling an emission state of the visible light emitted from the light emitting section, according to a communication state.

The visible light communication method further includes an emission zone control step of controlling an emission zone of the visible light emitted from the light emitting section, according to the communication state.

In the visible light communication method, the visible light communication apparatus further includes a control table for controlling the communication state and the emission state with a correspondence established therebetween. The emission control step includes detecting the communication state, referring to the control table according to the communication state thus detected, and controlling the emission state of the visible light emitted from the light emitting section to be an emission state corresponding to the communication state.

In the visible light communication method, the communication state is a communication state requiring human intervention to conduct information communication using visible light.

In the visible light communication method, the communication state is at least one selected from the states including a communication process to be established between the visible light communication apparatus and devices communicable therewith, a number of the devices communicable with the communication apparatus, a type of devices communicable with the communication apparatus, a kind of communication to be established between the communication apparatus and the devices communicable therewith, a transmission rate to be established between communication apparatus and devices communicable therewith, a remaining amount of information to be sent to the devices communicable with the communication apparatus, an error rate in the communication established between the communication apparatus and devices communicable therewith, and a type of an application to be used when the communication is established between communication apparatus and devices communicable therewith.

The visible light communication method further includes an emission synchronizing step of synchronizing the emission state of the visible light of the visible light communication apparatus with that of a device communicable therewith according to the state of a communication process established therebetween.

In the visible light communication method, the emission state is one selected from the states including a color of the visible light, a quantity thereof, and flashing thereof.

In accordance with one aspect of the present embodiments, there is provided a computer program causing a visible light communication apparatus including a light emitting section for emitting visible light to execute emission control processing for controlling an emission state of the visible light emitted from the light emitting section, according to a communication state.

The computer program further includes emission zone control processing for controlling an emission zone of the visible light emitted from the light emitting section, according to the communication state.

In the computer program, the visible light communication apparatus further includes a control table for controlling the communication state and the emission state with a correspondence established therebetween. The emission control processing includes detecting the communication state, referring to the control table according to the communication state thus detected, and controlling the emission state of the visible light emitted from the light emitting section to be an emission state corresponding to the communication state.

In the computer program, the communication state is a communication state requiring human intervention to conduct information communication using visible light.

In the computer program, the communication state is at least one selected from the states including a communication process to be established between the visible light communication apparatus and devices communicable therewith, a number of the devices communicable with the communication apparatus, a type of devices communicable with the communication apparatus, a kind of communication to be established between the communication apparatus and the devices communicable therewith, a transmission rate to be established between communication apparatus and devices communicable therewith, a remaining amount of information to be sent to the devices communicable with the communication apparatus, an error rate in the communication established between the communication apparatus and devices communicable therewith, and a type of an application to be used when the communication is established between communication apparatus and devices communicable therewith.

The computer program further includes emission synchronizing processing for synchronizing the emission state of the visible light of the visible light communication apparatus with that of a device communicable therewith according to the state of a communication process established therebetween.

In the computer program, the emission state is one selected from the states including a color the visible light, a quantity thereof, and flashing thereof.

In accordance with the present embodiments, by controlling the light emission state of the visible light radiated from the light emitting module, the communication state can be visually recognized. Thanks to the configuration in which the state of communication is recognizable during the visible light communication according to the light emission state of the visible light, the user can confirm the position of the communication apparatus existing in a ubiquitous fashion. It is also possible for the user to directly recognize the procedure of the communication process. This consequently provides the user with the feeling of security as well as satisfactory usability. Also, through intervention of the user having recognized the emission state of the visible light, it is possible to easily identify the apparatus being a partner of the visible light communication, and hence the communication quality is improved.

BRIEF DESCRIPTION OF THE DRAWINGS

The objects and features of the present invention will become more apparent from the consideration of the following detailed description taken in conjunction with the accompanying drawings in which:

FIG. 1 is a schematic block diagram showing a system configuration of a visible light communication system;

FIG. 3 is a diagram showing a structure of a control table held in the visible light communication unit with a correspondence established between the communication state and the emission state;

FIG. 6 is a flow diagram showing a sequence of processing steps;

FIG. 8 is a diagram showing a first configuration of a visible light communication unit;

FIG. 9 is a diagram showing a layout of a control table held in the visible light communication unit with a correspondence between the communication state and the emission zone;

FIG. 10 is a flow diagram showing a sequence of processing steps; and

FIG. 11 is a block diagram showing a second configuration of the visible light communication unit.

DESCRIPTION OF THE EMBODIMENTS

Figure 2:
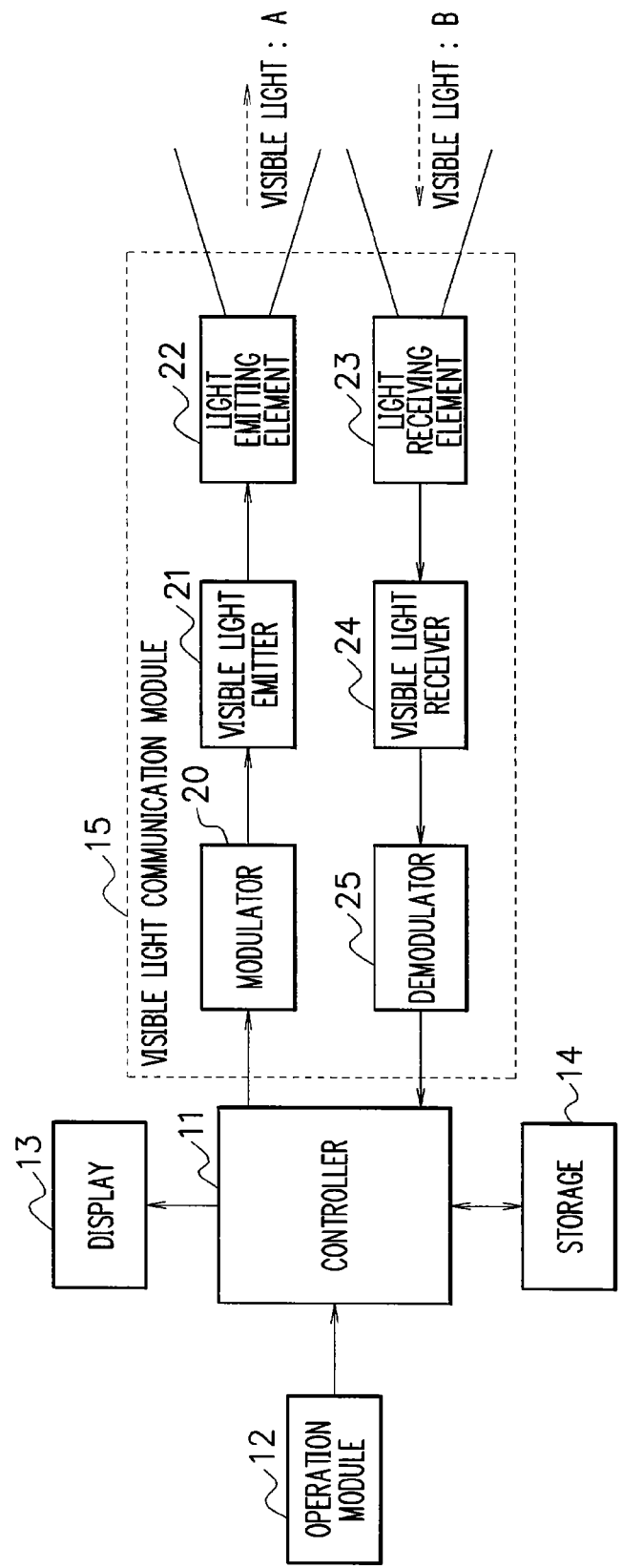
FIG. 2 is a block diagram showing a configuration of a visible light communication unit.

Referring next to FIG. 2, description will be given of a visible light communication apparatus according to an embodiment.

The visible light communication apparatus of the embodiment includes a visible light emitting section (a modulation module 20, a visible light emitting module 21, and a light emitting element 22) to emit visible light and a light emission control section (a controller 11) to control, according to a communication state, a light emission state of the visible light that is radiated from the visible light emitting section. In the configuration, the light emission state of the visible light from the light emitting section is controlled according to the communication state. Therefore, it is possible to visually recognize the communication state during the visible light communication. Referring now to the accompanying drawings, description will be given of the embodiment of the visible light communication apparatus.

First Embodiment

<System Configuration of Visible Light Communication System>

First, referring to FIG. 1, description will be given of the visible light communication system according to the first embodiment.

The communication system of the first embodiment includes a plurality of visual light communication apparatuses 1-1 to 1-N (N is a natural number) capable of conducting information communication using visible light. As the communication apparatus of the communication system, any unit capable of visible light communication is available. The available devices include, for example, a cellular phone, a Personal Digital Assistance (PDA), a Personal Computer (PC), a printer, imaging apparatuses such as a facsimile device, and family-use electric appliances such as a television set, an air conditioner, and an illumination device. Referring next to FIG. 2, description will be given of the visible light communication units 1-1 to 1-N employed in the first embodiment of the visible light communication system.

<Configuration of Visible Light Communication Unit>

The visible light communication unit (1-1 to 1-N) of the first embodiment includes a controller 11, an operation module 12, a display 13, a storage section 14, and a visible light communication module 15. The communication module 15 includes a modulator section 20, a visible light emitting section 21, a light emitting element 22, a light receiving element 23, a visible light receiving section 24, and a demodulator section 25. Each constituent element will now be described.

<Controller 11>

The controller 11 includes a Central Processing Unit (CPU) to execute various processing programs stored in the storage section 14. The controller 11 supervises processing and operation of the operation module 12, the display 13, the storage section 14, and the visible light communication unit 15.

<Operation module 12>

The operation module 12 includes a plurality of operation keys for an operator to input desired information. The module 12 inputs to the controller 11 information of instructions for various processing to be conducted by the controller 11 and/or desired information regarding the processing.

When the operator inputs from the operation unit 12, for example, transmission information to be sent to an external visible light transmission apparatus, the unit 12 receives the information and then feeds the information to the storage section 14.

When the operator inputs from the operation module 12 a reception command to receive information from an external visible light transmission apparatus, the module 12 receives the command and then delivers the command to the controller 11.

<Display 13>

The display 13 includes a liquid-crystal display or a thin-film liquid-crystal display such as an organic electroluminescence display panel and displays various information items under supervision of the controller 11.

The display 13 displays, for example, transmission information to be sent to external visible light transmission devices and/or information received therefrom under control of the control unit 11.

<Storage Section 14>

The storage section 14 includes a Read Only Memory (ROM) having stored data such as data of various processing programs to be executed by the CPU of the controller 11 and a Random Access Memory (RAM) to store operation parameters to execute various processing, information received from external visible light transmission devices, transmission information to be fed thereto, and the like.

<Visible Light Communication Module 15>

The visible light communication module 15 is a section to emit and to receive visible light and includes a modulator 20, a visible light emitter 21, a light emitting element 22, a light receiving element 23, a visible light receiver 24, and a demodulator 25.

The modulator 20 modulates transmission signals from the controller 11 to deliver modulated signals to the visible light emitter 21. Also, the modulator 20 outputs control signals delivered from the controller 11, to the visible light emitter 21 at timing synchronized with the modulated signal in time.

The visible light emitter 21 controls, according to the modulated signals and the control signals received from the modulator 20, for example, electric current to be fed to the light emitting element 22 to thereby emit visible light A.

The light emitting element 22 includes a semiconductor laser element, a light emitting diode, or the like to radiate the visible light A and emits the light A to an external visible light communication apparatus.

The light receiving element 23 converts visible light B received from an external visible light communication apparatus into an electric signal and sends the signal to the visible light receiver 24.

The visible light receiver 24 amplifies a change in the electric signal corresponding to a change in the quantity of the visible light received from the light receiving element 23 and then delivers the modified electric signal to the demodulator 25.

The demodulating section 25 demodulates the electric signal from the visible light receiver 24 into an associated received signal to output the signal to the controller 11.

Incidentally, the visible light communication unit 15 arbitrarily varies the emission state of the visible light from the light emitting element 22 according to the state of the communication with the external visible light communication unit. This can be implemented, for example, as below. The light emitting element 22 includes a device in which light-emitting diodes of three colors are integrally configured into one unit. The visible light emitter section 21 controls the quantity of light emitted from each of the diodes of the respective colors and timing to emit the light. This enables the operator to visually recognize the change in the emission state of the visible light from the light emitting element 22 to detect the state of the communication with the external visible light communication unit according to the change in the visible light emission state. Also, by employing, as the light receiving element 23, a plurality of elements each covering part of light receiving band by use of color filters, it is possible to execute the communication processing and at the same time discriminate the color of the visible light on the light emission side.

The communication states as factors that arbitrarily change the emission state of the visible light from the light emitting element 22 include, for example, a change in a communication process established with the visible light communication unit on the receiver side, the number of the communication units on the receiver side, device types such as a facsimile device or a copier of the communication unit on the receiver side, the kind of the communication to be established for the communication unit of the receiver, the transmission rate to be employed for the communication unit on the receiver side, the remaining amount of transmission information to be sent to the receiver-side communication unit, the error rate in the communication prepared for the communication unit on the receiver side, the type of application such as a game function, a telephone function, or a remote control function to be utilized when communication is set up for the receiver-side communication unit, and various combinations thereof.

The communication processes include any communication process to conduct data communication according to a communication protocol prescribed for each layer as in the protocol of the Open System Interconnection (OSI) model stipulated by the International Organization for Standardization (ISO).

The kinds of communication to be set up for the visible light communication unit as a receiver include, for example, the packet communication, the streaming communication like the television communication in which information is transmitted in one direction through online operation, the real time communication like the voice call in which information is bi-directionally transmitted, and the file communication in which multimedia information is sent in a file format and the file is thereafter opened to reproduce the information.

However, the communication states causing arbitrary changes in the visible light emission state are not limited to those described above. Any communication state in which intervention of a human being is required when the operator conducts information communication by use of the visible light can be regarded as a factor to change the visible light emission state. For example, each of the visible light communication units 1-1 to 1-N includes a control table as shown in FIG. 3 to control the communication state and the emission state of the visible light emitted from the light emitting element 22 with a correspondence established between the two state. When occurrence of a particular communication state is detected, the controller 11 refers to the control table of FIG. 3 and based on that communication state, controls an emission state of the visible light that is emitted from the element 22. The operator may arbitrarily set the control table of FIG. 3 using the operating module 12. The human intervention indicates an operation which can be conducted by a human to control a visible light communication unit after recognizing the visible light emission state, for example, an operation to interrupt the visible light communication, an operation to maintain a communication unit, or an operation to adjust distance between visible light communication units.

The emission states of the visible light from the light emitting element 22 include colors of the visible light, the quantity (brightness/darkness) of the visible light, blinking of the visible light, and various combinations thereof.

As a power source to drive the element 22 to emit the visible light A, there may be employed a battery (not shown) of the visible light communication unit or power obtained from the electromagnetic field generated by a loop antenna (not shown) which is used for a contactless Integrated Circuit (IC) chip or the like. For the light emitting element 22, an existing indicator such as a power source lamp may be used. In this situation, the element 22 operates as an indicator to urge a person to operate the visible light communication using the visible light communication apparatus.

<Processing and Operation in Visible Light Communication System>

Figure 4:
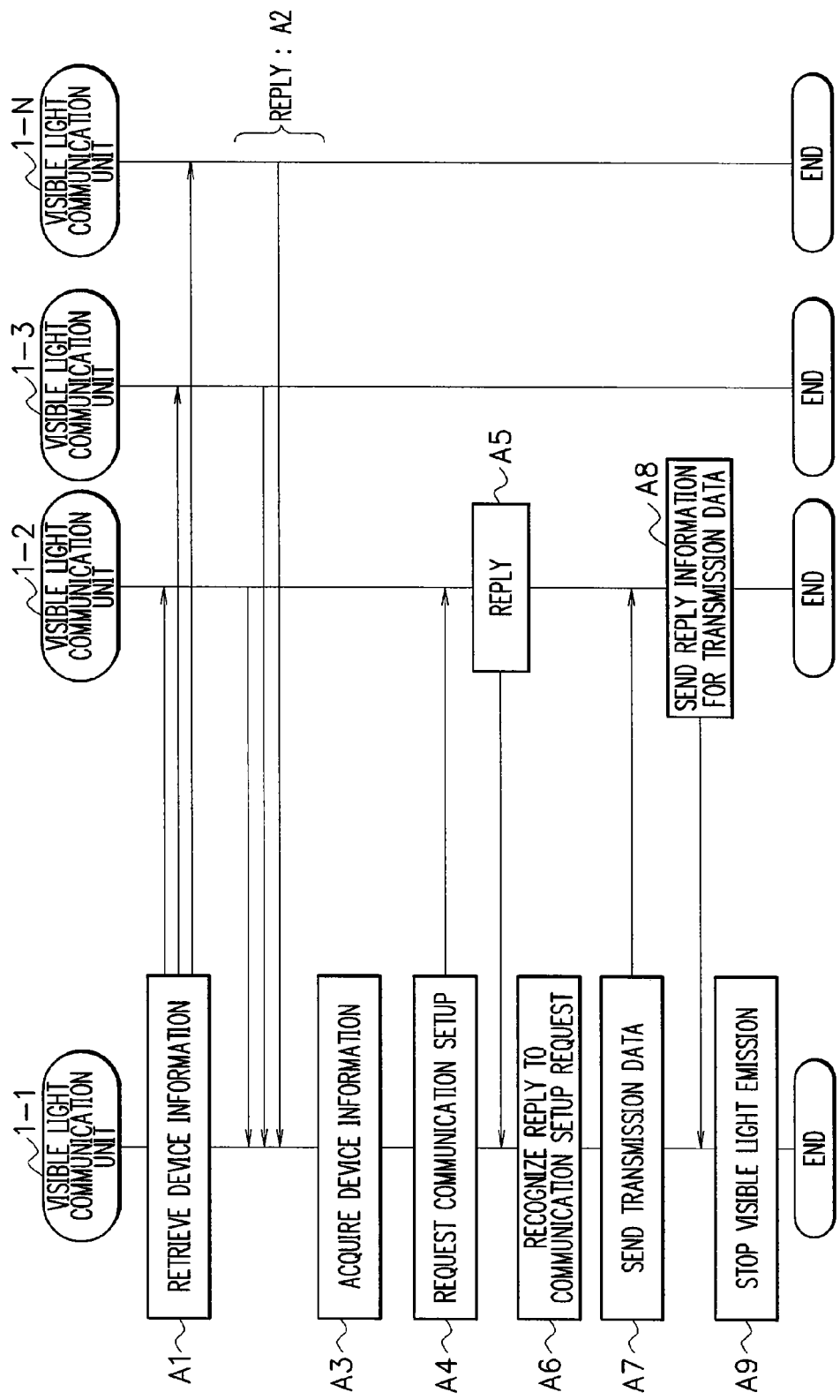
FIG. 4 is a flow diagram showing a sequence of processing steps.

Referring next to FIG. 4, description will be given of a sequence of processing and operation in the visible light communication system of the present embodiment. Here, the emission state (the color) of the visible light radiated from the light emitting device 22 changes only in the visible light communication unit 1-1, which is on the transmission side, based on the state (the communication process) of the communication with the visible light communication unit 1-N (N is an integer equal to or more than two), which is on the reception side.

First, when an operator inputs from the operation module 12 information of a retrieval processing request for the communication unit 1-1 to recognize a communication unit 1-N, the controller 11 receives the information from the operation module 12. According to the information, the controller 11 supervises the visible light communicating section 15 to radiate from the light emitting element 22 "red visible light" that contains device information (an identifier, a device type of the transmission-side unit, a Cyclic Redundancy Check (CRC1), and the like) required for the retrieval processing (step A1).

In response thereto, the communicating section 15 radiates the red visible light from the light emitting element 22. The operator on the transmission side confirms, by visually recognizing the red visible light, that the communication apparatus 1-1 is conducting the retrieval processing with the communication apparatus 1-N. Diffused reflection of the visible light from the communication apparatus 1-1 lights up an area around the communication apparatus 1-N. The operator on the transmission side hence can recognize the location of the apparatus 1-N in many cases. It is therefore possible for the operator to steer the optical axis of the visible light emitted from the communication apparatus 1-1 to the communication apparatus 1-N.

After having received the red visible light from the communication unit 1-1, the communication unit 1-N conducts a cyclic redundancy check. In an operation to reply to the retrieval processing request from the communication unit 1-1, the communication unit 1-N transmits thereto "red visible light" including device information of the communication unit 1-N (an identifier, a device type of the receiver-side unit, CRC2, and the like) (step A2). In the operation, the communication unit 1-N may emit the visible light at a random interval to thereby avoid collision between signals.

When the red visible light including the device information (the identifier, the device type of the receiver-side unit and CRC2) is received from the communication unit 1-N, the communication unit 1-1 confirms the CRC code to acquire the device information sent from the communication unit 1-N (step A3).

Thereafter, the operator selects by use of the operation module 12 a visible light communication unit 1-2 from the visible light communication units (1-N) from which the device information is received as described above. The operator inputs information of a communication setup request to conduct visible light communication with the communication unit 1-2 thus selected. In response thereto, the controller 11 receives the information of the request from the operation module 12. Using the information, the controller 11 supervises the visible light communicating section 15 to emit from the light emitting element 22 "green visible light" which contains communication setup request information (an identifier of a transmission-side unit, an identifier of a reception-side unit, CRC3, and the like) required to conduct visible light communication with the communication unit 1-2 (step A4).

Resultantly, the communicating section 15 radiates the green light from the light emitting element 22. By visually perceiving the green light emitted from the light emitting element 22, the operator on the transmitter side confirms that the communication unit 1-1 is requesting the communication setup for visible light communication with the communication unit 1-2.

When the green visible light from the communication unit 1-1 is received, the communication unit 1-2 conducts a cyclic redundancy check. To reply to the communication setup request from the communication unit 1-1, the communication unit 1-2 transmits thereto "green visible light" including information required to reply to the communication setup request (an identifier of the transmitter-side unit, an identifier of the receiver-side unit, CRC3, and the like) (step A5). Any communication unit on the receiver side that has received the green visible light from the communication unit 1-1 but whose ID does not match the receiver-side ID contained in the communication setup request information stops the transmission of the red visible light.

The communication module 1-1 receives, from the communication module 1-2, the green visible light including the information to reply to communication setup request (a transmitter-side unit ID, a receiver-side unit ID, and CRC3). The controller 11 confirms the CRC3 and obtains the information required to reply to communication setup request (step A6).

When the operator inputs from the operation module 12 transmission information to send transmission data to the visible light communication unit 1-2, the controller 11 receives the information from the operation module 12. According to the information, the controller 11 supervises the visible light communicating section 15 to radiate from the light emitting element 22 "yellow visible light" containing transmission information (a transmission-side unit ID, a reception-side unit ID, transmission data, CRC3, and the like) to be delivered to the receiver-side communication unit 1-2 (step A7).

Thereafter, the communicating section 15 emits the yellow visible light from the light emitting element 22. By visually recognizing the yellow light from the light emitting element 22, the operator on the transmission side confirms that the communication unit 1-1 is sending the transmission data to the receiver-side communication unit 1-2.

When the yellow visible light radiated from the communication unit 1-1 is received, the communication unit 1-2 acquires the transmission data from the communication unit 1-1. In the operation, the communication unit 1-2 makes a cyclic redundancy check according to the transmission data. If the result of the check indicates that the transmission data has been appropriately obtained, the communication unit 1-2 sends to the communication unit 1-1 "yellow visible light" including response information of the correct reception of the transmission data (the transmitter-side unit ID, a receiver-side unit ID, Acknowledge (ACK), and the like) (step A8).

The communication module 1-1 receives, from the communication module 1-2, the yellow visible light including the response information. When the response information (the transmitter-side unit ID, a receiver-side unit ID, and ACK) is received for each data item sent from the communication module 1-1 to the communication module 1-2, the controller 11 assumes that the transmission of the data is finished and controls the visible light communicating section 15 to stop the emission of the yellow visible light from the light emitting element 22 (step A9).

In response thereto, the communicating section 15 stops the emission of the visible light from the element 22. By visually perceiving that the emission of the yellow light from the light emitting element 22 has been stopped, the operator of the communication unit 1-1 recognizes that the transmission data has been completely delivered.

As a result of the check of the CRC code for the transmission data from the communication unit 1-1, if it is determined that the data has not been appropriately obtained (i.e., because of an error) on the receiver side, the communication unit 1-2 sends to the communication unit 1-1 "red visible light" including re-transmission information requesting the retransmission of data (a transmitter-side unit ID, a receiver-side unit ID, Negative Acknowledge (NAK), and the like) to thereby urge the communication unit 101 to retransmit the data. If such error frequently occurs, the communication unit 1-2 more frequently emits the red visible light to the communication unit 1-1 and hence the ratio of the red light emission in the emission time becomes larger. The change in the ratio in the emission time between the yellow visible light and the red visible light enables the operator of the communication unit 1-1 to recognize the state of change in the communication quality for the data transmission.

If it is determined that the reply time for ACK or NAK has lapsed before the data transmission to the communication unit 1-2 is finished, the communication unit 1-1 flashes "red visible light" for a fixed period of time without modulation. This makes the operator of the communication unit 1-1 recognize that the communication has been interrupted.

In the present embodiment of the visible light communication system, the transmitter-side visible light communication unit 1-1 changes the emission state, i.e., the color of the visible light radiated from the light emitting element 22 according to the change in the state of the communication (communication process) during the visible light communication to thereby enable the user of the communication unit 1-1 to visually recognize the communication state in the visible light communication. This facilitates the operation for the operator to conduct the visible light communication using the communication unit 1-1 to thereby mitigate the feeling of uneasiness about the operation during the visible light communication.

Second Embodiment

Figure 5:
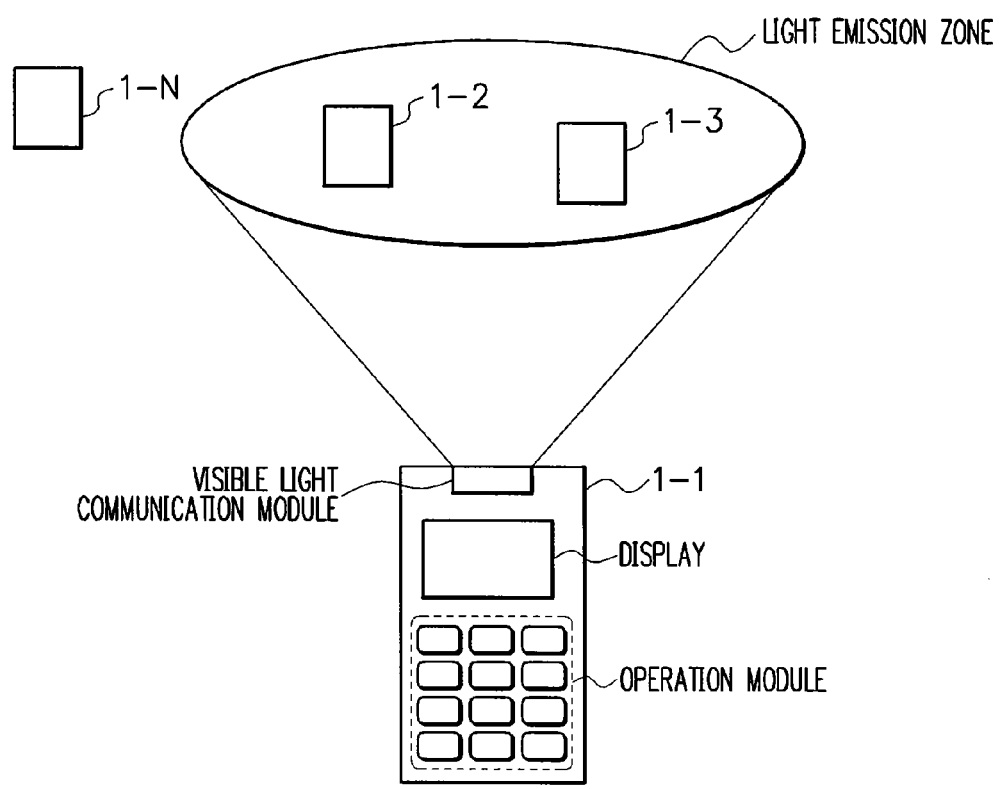
FIG. 5 is a block diagram schematically showing a system configuration of a second embodiment of the visible light communication system.

Next, description will be given of a second embodiment of the visible light communication system As above, in the first embodiment of the visible light communication system, the visible light communication apparatus 1-1 on the transmission side changes during the visible light communication the emission state (the color) of the visible light from the light emitting element 22 according to the change in the communication state (the communication process). In the second embodiment, the visible light communication apparatus (1-1 to 1-N) on the reception side alters the emission state or the color of the visible light emitted from the light emitting element 22 according to the change in the communication state or the communication process. It is therefore possible for an operator of the transmitter-side communication unit 1-1 to visually recognize which one of the receiver-side communication units 1-2 to 1-N is conducting communication with the communication unit 1-1. Referring next to FIGS. 5 and 6, description will be given of the second embodiment of the visible light communication system.

First, referring to FIG. 5, description will be given of the system configuration of the second embodiment. FIG. 5 shows a positional relationship between the transmitter-side communication unit 1-1 and the receiver-side communication units 1-2 to 1-N in a visible light communication system.

As can be seen from FIG. 5, the system includes a visible light communication unit 1-1 on the transmission side and visible light communication units 1-2 to 1-N on the reception side. In this system, the second and third communication units 1-2 and 1-3 exist "within an emission zone" of visible light radiated from the transmitter-side communication unit 1-1, and the receiver side communication unit 1-N is out of the emission zone of the communication unit 1-1.

Referring now to FIG. 6, description will be given of a sequence of processing steps in the second embodiment. FIG. 6 shows a sequence of steps under the positional relationship of the communication apparatus 1-1 and the communication apparatuses 1-2 to 1-N shown in FIG. 5.

First, the operator inputs from the operation module 12 information of a retrieval processing request to detect a communication unit 1-N on the receiver side controllable by the communication unit 1-1. The controller 11 receives the information from the operation module 12. According to the information, the controller 11 supervises the visible light communication section 15 so that the light emitting element 22 radiates "red visible light" including device information (an identifier, a unit type of a transmitter-side unit, CRC1, and the like) of the communication unit 1-1, the information being required for information retrieval. The communication section 15 then emits the red visible light from the element 22 (step B1).

Each of the communication apparatuses 1-2 and 1-3 having received the red visible light from the communication apparatus 11 conducts a cyclic redundancy check. To reply to the retrieval processing request from the communication apparatus 1-1, the communication apparatus (1-2, 1-3) sends to the communication apparatus 1-1 "red visible light" including device information (an identifier, a unit type of a receiver-side unit, CRC2, and the like) of the communication apparatus (1-N) (step B2). Each of the other communication apparatuses 1-N that are not able to receive the light from the communication apparatus 1-1 cannot reply to the retrieval processing request, and hence enters a state in which the apparatus 1-N cannot emit the red visible light.

As a result, the operator of the communication apparatus 1-1 can visually recognize the communication apparatus (1-2, 1-3) having emitted the red visible light to regard the apparatus as capable of replying to the retrieval processing request from the communication apparatus 1-1.

When the communication apparatus 1-1 receives the red visible light including the device information from the receiver-side apparatus (1-2, 1-3), the controller 11 carries out a cyclic redundancy check to obtain the device information from the apparatus (1-2, 1-3) (step B3).

Next, from the communication apparatuses 1-2 and 1-3 from which the device information has been received, the operator selects by use of the operation module 12 an apparatus 1-2 and then inputs information of a communication setup request to communicate with the apparatus 1-2. The controller 11 then receives the information from the operation module 12. Using the information, the controller 11 controls the visible light communicating section 15 to radiate from the light emitting element 22 "green visible light" including communication setup request information (a transmitter-side unit ID, a receiver-side unit ID, CRC3, and the like). The communicating section 15 radiates the green visible light from the light emitting element 22 (step B4).

When the green visible light is received from the apparatus 1-1, the apparatus 1-2 makes a cyclic redundancy check. To response to the communication setup request from the apparatus 1-1, the apparatus 1-2 transmits thereto "green visible light" including (a transmitter-side unit ID, a receiver-side unit ID, CRC3, and the like) necessary to respond to the request (step B5). For this purpose, the communication apparatus 1-2 changes the emission light from the red visible light to the green visible light. Incidentally, since the communication apparatus 1-3 having received the green visible light from the apparatus 1-1 cannot receive the information needed to respond to the communication setup request from the apparatus 1-1 or since the information of the green visible light from the apparatus 1-1 includes an error (for example, the receiver-side unit ID does not match its own ID), the communication apparatus 1-3 cannot reply to the request from the apparatus 1-1. Therefore, although the communication apparatus 1-3 can receive the visible light from the apparatus 1-1, the apparatus 1-3 continues emitting the red light or stops the emission thereof.

As a result, the operator of the communication apparatus 1-1 on the transmitter side can visually perceive that the emission light from the receiver-side communication apparatus 1-2 has been changed from the red visible light to the green visible light. Therefore, the operator is capable of identifying the apparatus 1-2 which can respond to the communication setup request from the apparatus 1-1.

When the green visible light containing the information (a transmitter-side unit ID, a receiver-side unit ID, CRC3, and the like) necessary to respond to the request is received from the apparatus 1-2, the controller 11 makes the cyclic redundancy check and acquires the information (step B6).

Subsequently, when the operator inputs from the operation module 12 transmission information to send transmission data to the receiver-side communication apparatus 1-2, the controller 11 receives the information from the module 12. On the basis of the information, the controller 11 controls the visible light communicating section 15 to radiate from the light emitting element 22 "yellow visible light" including transmission information (a transmitter-side unit ID, a receiver-side unit ID, CRC3, and the like). The communicating section 15 accordingly emits the yellow visible light from the light emitting element 22 (step B7).

Upon reception of the yellow visible light from the apparatus 1-1, the receiver-side apparatus 1-2 acquires the transmission data therefrom. In this situation, the apparatus 1-2 changes the emission light from the green visible light to the yellow visible light.

Therefore, it is possible for the operator of the apparatus 1-1 to visually perceive the apparatus 1-2 of which the emission light has been changed from green to yellow and recognizes that the apparatus 1-2 capable of responding to the communication setup request from the apparatus 1-1 is acquiring the transmission data from the apparatus 1-1.

After having received the transmission data from the apparatus 1-1, the communicating apparatus 1-2 carries out the cyclic redundancy check. If the result of the check indicates that the data has been correctly attained, the apparatus 1-2 sends to the transmitter-side apparatus 1-1 "yellow visible light" including reply information (a transmitter-side unit ID, a receiver-side unit ID, ACK, and the like) indicating the appropriate acquisition of the transmission data (step B8).

If the result of the check of the transmission data from the apparatus 1-1 indicates that the data has not been correctly attained (errors), the apparatus 1-2 sends to the apparatus 1-1 "red visible light" including retransmission information (a transmitter-side unit ID, a receiver-side unit ID, NAK, and the like) requesting retransmission of the data to thereby urge the apparatus 1-1 to conduct the retransmission (step B8).

This hence enables the operator of the apparatus 1-1 to visually recognize the yellow or red light from the apparatus 1-2. According to the ratio in the emission time between the yellow visible light and the red visible light, the operator can recognize a change in the communication quality of the data transmission.

The apparatus 1-1 receives the yellow visible light including response information (a transmitter-side unit ID, a receiver-side unit ID, ACK, and the like) from the apparatus 1-2. When the response information is received for all data sent from the apparatus 1-1 to the apparatus 1-2, the controller 11 assumes completion of the transmission of the data and supervises the visible light communication section 15 to terminate the light emission from the light emitting element 22 (step B9).

Therefore, the communicating section 15 stops the visible light emission from the element 22. The operator of the transmitter-side communication apparatus 1-1 visually perceives the termination of the yellow light emission from the element 22 to thereby recognize the completion of the data transmission.

As above, according to the second embodiment of the visible light communication system, one of the receiver-side visible light communication units 1-2 to 1-N changes the emission state, namely, the color of the visible light radiated from the light emitting element 22 according to the change in the state of the communication (communication process). Therefore, the operator of the communication unit 1-1 can visually recognize the communication state during the visible light communication. As a result, the operator can easily conduct the visible light communication. This hence reduces the feeling of uneasiness during the operation of the visible light communication.

It is also possible in the second embodiment for the communication unit (1-2, . . . , 1-N) on the reception side to control the emission state of the visible light from the light emitting element 22 to be synchronized with the emission state of the communication unit 1-1 according to the state of the communication with the communication unit 1-1. The operator of the apparatus 1-1 can visually detect that the receiver-side communication unit (1-2, . . . , 1-N) is synchronized with the emission state of the communication unit 1-1. Therefore, the operator can easily conduct the visible light communication. This hence much more mitigates the feeling of uneasiness on the operator during the visible light communication.

Third Embodiment

Next, description will be given of a third embodiment of the visible light communication system.

The third embodiment has an aspect that during the visible light communication between the transmitter-side visible light communication unit 1-1 and the receiver-side visible light communication units 1-2 to 1-N, the communication unit 1-1 changes the emission zone of the visible light according to a change in the communication state. For example, as can be seen from FIG. 7A, when a plurality of communication units 1-2 to 1-N exist in the emission zone of the communication unit 1-1, the unit 1-1 receives visible light from the plural communication units 1-2 to 1-N. This may cause interference between the lights. To cope with this difficulty, during the visible light communication, the communication unit 1-1 varies the emission zone of the communicating module 15 to thereby receive the visible light from one of the communication units 1-2 to 1-N. This prevents the interference between the lights. Narrowing the emission angle of the visible light improves the communication quality. Referring next to FIGS. 8 to 10, description will be given of the third embodiment of the visible light communication system.

First, referring to FIG. 8, the configuration of the visible light communication apparatus is explained.

As shown in FIG. 8, the apparatus includes an emission zone changing module 26 to change the emission zone of the visible light radiated from the light emitting element 22. The controller 11 supervises the module 26 according to the communication state. Under supervision of the controller 11, the module 26 changes the emission zone of the visible light.

In this regard, the communication states acting as factors to change the emission zone of the light from the element 22 include, for example, a change in a communication process to be established between the communication apparatuses, the number of the communication apparatuses on the receiver side, the device type (for example, a facsimile device or a copier), the variety of communication, the transmission rate, the remaining amount of transmission information to be sent to another communication apparatus, the error rate in the communication, an application type (for example, a game function, a telephone function, or a remote control function) to be used when communication is set up, and various combinations thereof.

Additionally, the available communication processes include any communication process available for data communication according to a communication protocol prescribed for each layer like the protocol of the OSI (Open System Interconnection) model stipulated by ISO.

The variety of communication to be established between communication apparatuses includes, for example, the packet communication, the streaming communication like the television communication in which information is sent in one direction in real time, the real time communication like the voice communication in which information is bi-directionally transmitted in real time, and the file communication in which multimedia information is sent in file format and the file is thereafter opened to reproduce the information.

However, the communication states causing the change in the visible light emission zone are not limited to those described above. Any communication state in which the operator desires to arbitrarily change the visible light emission zone may be regarded as a factor to change the visible light emission zone. For example, each of the visible light communication apparatuses 1-1 to 1-N includes a control table as shown in FIG. 9 to control the communication state and the emission zone of the visible light. Upon detection of a particular communication state, the controller 11 refers to the control table of FIG. 9 according to the detected communication state such that the visible light is emitted from the element 22 in an emission angle ($\alpha°$) corresponding to the communication state. Incidentally, it is possible for the operator to freely set the control table of FIG. 9 by use of the operating module 12.

Referring now to FIG. 10, description will be given of the processing executed in the third embodiment of the visible light communication system.

The operator first operates the operation module 12 to input retrieval processing request information for the transmitter-side communication unit 1-1 to detect the receiver-side communication unit 1-N that can be controlled by the communication unit 1-1. The controller 11 supervises the visible light communicating section 15 to radiate from the light emitting element 22 "red visible light" containing device information (an ID, a device type of the transmitter-side unit, CRC1, and the like) of the communication unit 1-1, the information being required for the retrieval processing (step C1).

Figure 7A:
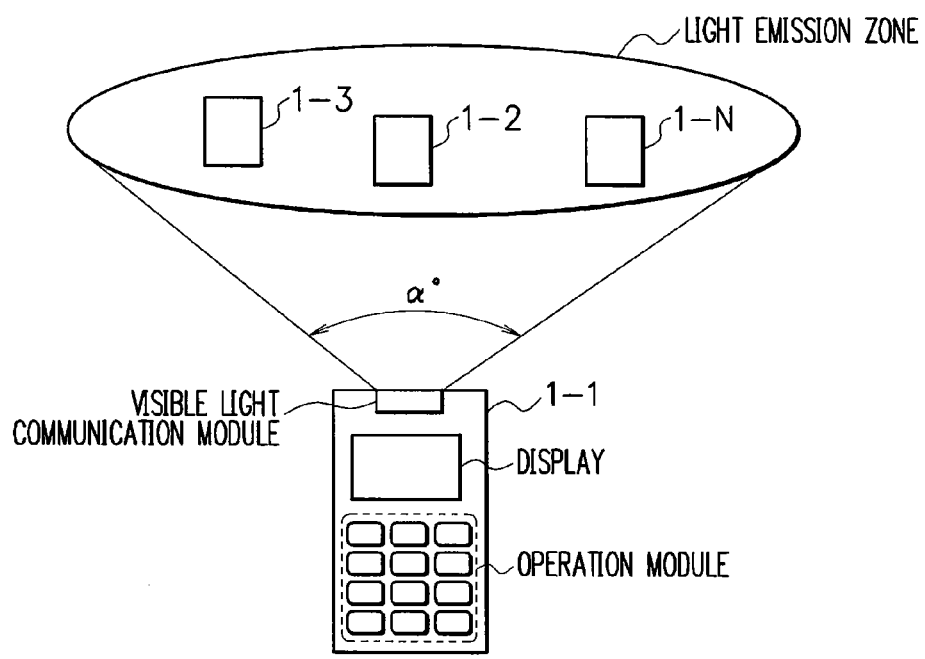
FIG. 7A is a schematic block diagram showing a system configuration with an emission zone of a third embodiment.

In response thereto, the communication unit 1-1 emits the red visible light in an emission zone for the plural communication units 1-2 to 1-N to receive the light as shown in FIG. 7A.

The communication units 1-2 to 1-N receive the red visible light from the communication unit 1-1 and then make a cyclic redundancy check. To reply to the retrieval processing request from the communication unit 1-1, the communication unit 1-N transmits thereto "red visible light" including device information of the communication unit 1-N (an ID, a device type of the receiver-side unit, CRC2, and the like) (step C2).

It is therefore possible for the operator on the transmitter side to visually recognize the receiver-side communication unit (1-2, ..., 1-N) having radiated the red visible light to determine that the receiver-side unit can reply to the retrieval processing request from the communication unit 1-1.

When the unit 1-1 receives the red visible light containing the device information from the receiver-side unit (1-2, ..., 1-N), the controller 11 of the unit 1-1 conducts the cyclic redundant check and acquires the device information (step C3).

Figure 7B:
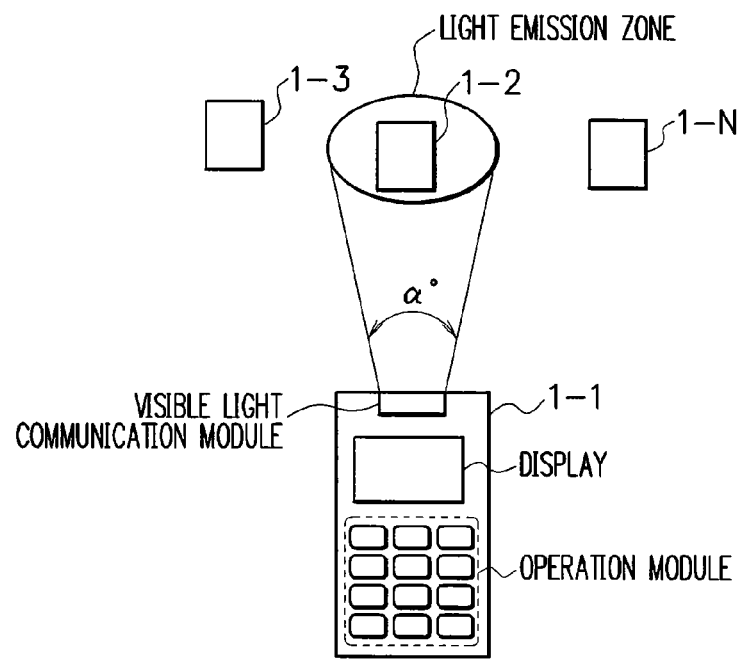
FIG. 7B is a block diagram schematically showing a system configuration in which the emission zone of FIG. 7A is narrowed.

In this situation, although the controller 11 of the communication unit 1-1 receives a plurality of device information pieces sent from the plural communication units 1-2, ..., and 1-N, the controller 11 supervises the emission zone changing module 26 to receive the device information from only one receiver-side communication unit. That is, the module 26 changes the emission zone as shown in FIG. 7B so that only one receiver-side communication unit 1-2 receives the red light (step C4).

Therefore, only the communication unit 1-2 that can receive the red light from the communication unit 1-1 transmits the red visible light containing the device information of the unit 1-2 to the communication unit 1-1 (step C5). The operator of the unit 1-1 can visually perceive only the communication unit 1-2 having emitted the red light to thereby recognize that the visible light communication is established only with the communication unit 1-2.

Since the communication unit 1-1 on the transmission side receives only one piece of device information from the unit 1-2, the controller 11 recognizes the communication state in which the visible light communication is established only with the communication unit 1-2. In this case, the controller 11 changes the emission state of the red visible light radiated from the communication unit 1-1. The operator hence detects that the visible light communication is established with the particular communication unit on the receiver side.

In this regard, the processing of steps C6 to C11 of the third embodiment is almost the same as that of steps A4 to A9 of the first embodiment.

As above, in the third embodiment of the visible light communication system, when the communication apparatus 1-1 on the transmitter side communicates with the communication apparatuses 1-2 to 1-N on the receiver side using visible light, the apparatus 1-1 alters the emission zone where the light illuminates according to the communication state. It is hence possible to automatically determine the particular communication apparatus (1-2, ..., 1-N) communicable with the transmitter-side apparatus 1-1.

Although the visible light emission zone is controlled so that the apparatus 1-1 receives the device information only from one receiver-side communication unit 1-2 in the third embodiment, the system may also be configured such that the emission zone is controlled to prevent a communication error and a burst error during the communication between the apparatus 1-1 and the apparatuses 1-2 to 1-N. For example, if a communication error occurs at random, the visible light emission zone is reduced. If there occurs a burst error, the emission zone is expanded.

As can be seen from FIG. 11, it is also possible to construct the visible light communication apparatus including a light receiving zone change module 27 to alter the visible light receiving zone for the light receiving element 23 to receive light therefrom. The controller 11 supervises the module 27 according to the communication state. In response thereto, the module 27 varies the light receiving zone. As a result, the visible light receiving zone is altered for the light receiving element 23 according to the communication state to increase the quantity of light received by the element 23 to thereby improve the communication quality of the visible light for the light receiving element 23.

Incidentally, description has been given of only favorable embodiments in accordance with the present invention. That is, the present invention is not restricted by those embodiments. The embodiments can be modified and changed in various ways within the scope and spirit of the present invention.

For example, according to the embodiments, the control operation of the visible light communication apparatus during the visible light communication is also applicable to a communication process in a configuration in which the constituent components are mutually connected via the Universal Plug & Play (UPNP) to conduct visible light communication. Also, the control operation can be used in a modem's "falldown" process. According to a change in the processes, the system may be configured to control the emission state and the emission zone of the visible light emitted from the light emitting element 22. For example, when it is found via a communication node of the application UPNP of the apparatus that a network does not have an expected device or a target device, the communication is interrupted even if the communication node and the communication link are normal. The color of the visible light is then changed to a color not used for the communication. That is, the light is employed as an indicator notifying that the device is not available for the service.

In addition, the control operation of the embodiments may also be implemented using not only the hardware configuration, but also by software such as computer programs. The programs may be stored in a recording medium such as an optical recording medium, a magnetic recording medium, an optomagnetic recording medium, or a semiconductor recording medium. The programs are read therefrom by the visible light communication apparatus capable of conducting visible light communication. Using the programs, the apparatus carries out the control operation. Moreover, the apparatus may read the programs via an external device connected to a predetermined network to conduct the control operation according to the programs.

The apparatus, the system, the method, and the program for visible light communication in accordance with the present embodiments are applicable to devices capable of conducting visible light communication such as a personal digital assistance, a personal computer, a printer, imaging apparatuses such as a facsimile device, and family-use electric appliances such as a television set, an air conditioner, and an illumination device.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A transmitter-side visible communication apparatus for communicating with a receiver-side visible light communication apparatus using visible light, comprising:

light emitting means for emitting the visible light toward a number of receiver-side visible light communication apparatuses;

light receiving means for receiving the visible light which a number of receiver-side visible light communication apparatuses emitted; and emission control means for controlling an emission state of the light emitting means by a) controlling the light emitting means to emit the visible light of a first color including ID of the transmitter-side visible communication apparatus as a search processing request, when the search processing request for recognizing the receiver-side visible light communication apparatus which carries out the communication is emitted;

b) controlling the light emitting means to emit the visible light of a second color including ID of the receiver-side visible light communication apparatus which emits communication establishment request and ID of the transmitter-side visible communication apparatus, when the receiver-side visible light communication apparatus which communicates the information communication is specified, based on information from the receiver-side visible light communication apparatus that the search processing request responded and the communication establishment request is emitted toward the specified receiver-side visible light communication apparatus; and c) controlling the light emitting means to emit the visible light of a third color including transmission data, when the transmission data is emitted to the receiver-side visible light communication apparatus which responded to the communication establishment request based on information included in the visible light received by the light receiving means.

2. A transmitter-side visible communication apparatus according to claim 1, wherein when a response for all the transmission data emitted to the receiver-side visible light communication apparatus has been recognized, based on information included in the visible light received by the light receiving means, the emission control means controls the light emitting means to stop the emission of the visible light of the third color.

3. A transmitter-side visible communication apparatus according to claim 1, further comprising:
   emission zone control means for controlling an emission zone of the visible light which the light emitting means emits when the number of receiver-side visible light communication apparatuses have been recognized, based on information included in the visible light received by the light receiving means; wherein
   the emission zone control means controls the emission zone of the visible light of the first color emitted by the light emitting means so that one receiver-side visible light communication apparatus receives the visible light of the first color.

4. A transmitter-side visible communication apparatus according to claim 1, wherein
   the light receiving means includes a number of light-sensitive elements provided for the visible light of each color carrying out light receiving zone correspondence.

5. A number of receiver-side visible light communication apparatuses for communicating with a transmitter-side visible communication apparatus using visible light, comprising:
   light emitting means for emitting the visible light toward the transmitter-side visible communication apparatus;
   light receiving means for receiving the visible light which the transmitter-side visible communication apparatus emitted; and
   emission control means for controlling an emission state of the light emitting means by
   a) controlling the light emitting means to emit the visible light of a first color including ID of the receiver-side visible light communication apparatus, when a search processing request emitted from the transmitter-side visible communication apparatus in order to recognize the receiver-side visible light communication apparatus for communicating an information communication is responded to;
   b) controlling the light emitting means to emit the visible light of a second color including ID of the transmitter-side visible communication apparatus and ID of the receiver-side visible light communication apparatus, when the communication establishment request from the transmitter-side visible communication apparatus is responded to based on information included in the visible light which the light receiving means received; and
   c) controlling the light emitting means to emit the visible light of a third color including response information, when responding for transmission data from the transmitter-side visible communication apparatus based on information included in the visible light received by the light receiving means.

6. A receiver-side visible light communication apparatus according to claim 5, the emission control means further comprising:
   fourth control means for controlling so that the light emitting means emits the visible light of a fourth color including information of resending a request when the resending request of the transmission data is carried out based on information included in the visible light received by the light receiving means.

7. A receiver-side visible light communication apparatus according to claim 5, wherein the emission control means controls the light emitting means to emit the visible light at a random interval.

8. A receiver-side visible light communication apparatus according to claim 5, further comprising:
   emission synchronous means for synchronizing an emission state of the light emitting means with the transmitter-side visible communication apparatus according to a state of a communication process established by the transmitter-side visible communication apparatus.

9. A receiver-side visible light communication apparatus according to claim 5, wherein
   the light receiving means includes a number of light-sensitive elements provided for the visible light of each color for carrying out light receiving zone correspondence.

10. A visible light communication system for conducting an information communication using visible light, comprising:
   a receiver-side visible light communication apparatus for conducting the information communication using visible light;
   and a transmitter-side visible communication apparatus including light emitting means which emits visible light toward a number of receiver-side visible light communication apparatuses, light receiving means which receives visible light from receiver-side visible light communication apparatus, and
   an emission control means which controls an emission state of the light emitting means by
   a) controlling the light emitting means to emit the visible light of a first color including ID of the transmitter-side visible communication apparatus as a search processing request, when the search processing request for recognizing the receiver-side visible light communication apparatus which carries out the communication is emitted;
   b) controlling the light emitting means to emit the visible light of a second color including ID of the receiver-side visible light communication apparatus which emits communication establishment request and ID of the transmitter-side visible communication apparatus, when the receiver-side visible light communication apparatus which communicates the information communication is specified, based on information from the receiver-side visible light communication apparatus that the search processing request responded and the communication establishment request is emitted toward the specified receiver-side visible light communication apparatus; and
   c) controlling the light emitting means to emit the visible light of a third color including transmission data, when the transmission data is emitted to the receiver-side visible light communication apparatus which responded to the communication establishment request based on information included in the visible light received by the light receiving means.

11. A visible light communication system according to claim 10, wherein
   when a response for all the transmission data emitted to the receiver-side visible light communication apparatus has been recognized based on information included in the visible light received by the light receiving means, the emission control means controls the light emitting means to stop the emission of the visible light of the third color.

12. A visible light communication system for communication using visible light, comprising:
- a transmitter-side visible communication apparatus for conducting the information communication using visible light; and
- a receiver-side visible light communication apparatus including a light emitting means which emits the visible light to transmitter-side visible communication apparatus, a light receiving means which receives the visible light which the transmitter-side visible communication apparatus emitted, and
- emission control means which controls emission state of the visible light emitted by the light emitting means by
  a) controlling the light emitting means to emit the visible light of a first color including ID of the receiver-side visible light communication apparatus, when a search processing request emitted from the transmitter-side visible communication apparatus in order to recognize the receiver-side visible light communication apparatus for communicating an information communication is responded to;
  b) controlling the light emitting means to emit the visible light of a second color including ID of the transmitter-side visible communication apparatus and ID of the receiver-side visible light communication apparatus, when the communication establishment request from the transmitter-side visible communication apparatus is responded to based on information included in the visible light which the light receiving means received; and
  c) controlling the light emitting means to emit the visible light of a third color including response information, when responding for transmission data from the transmitter-side visible communication apparatus based on information included in the visible light received by the light receiving means.

13. A visible light communication system according to claim 12, wherein
  when the resending request is carried out for the transmission data from the transmitter-side visible communication apparatus based on information included in the visible light received by the light receiving means, the emission control means controls so that the light emitting means emits the visible light of a fourth color including information of a resending request.

14. A visible light communication method in transmitter-side visible communication apparatus including emission control means which controls an emission state of the light emitting means, a light emitting means which emits visible light toward the receiver-side visible light communication apparatus and light receiving means which receives visible light from receiver-side visible light communication apparatus, for conducting the receiver-side visible light communication apparatus communication using visible light, comprising:
  a first control process step for controlling the light emitting means to emit the visible light of a first color including ID of the transmitter side visible communication apparatus as a search processing request, when the search processing request for recognizing the receiver-side visible light communication apparatus which carries out the communication is emitted;
  a second control process step for controlling the light emitting means to emit the visible light of a second color including ID of the receiver side visible light communication apparatus which emits communication establishment request and ID of the transmitter side visible communication apparatus, when the receiver-side visible light communication apparatus which communicates the information communication is specified based on information from the receiver-side visible light communication apparatus that the search processing request responded and the communication establishment request is emitted toward the specified receiver-side visible light communication apparatus; and
  a third control process step for controlling the light emitting means to emit the visible light of a third color including transmission data, when the transmission data is emitted to the receiver-side visible light communication apparatus which responded to the communication establishment request based on information included in the visible light received by the light receiving means.

15. A visible light communication method according to claim 14, further including:
  a fourth control process step for controlling the light emitting means to stop the emission of the visible light of the third color when a response for all the transmission data emitted to the receiver-side visible light communication apparatus has been recognized based on information included in the visible light received by the light receiving means.

16. A visible light communication method in a receiver-side visible light communication apparatus includes an emission control means which controls an emission state of the light emitting means, light emitting means which emits visible light toward transmitter-side visible communication apparatus, and light receiving means which receives visible light which transmitter-side visible communication apparatus emitted, for conducting the transmitter-side visible communication apparatus using visible light, comprising:
  a first-control process step for controlling so that the light emitting means emits visible light of a first color including ID of the receiver side visible light communication apparatus, when a search processing request from the transmitter-side visible communication apparatus is responded to based on information included in the visible light received by the light receiving means;
  a second control process step for controlling so that the light emitting means emits the visible light of a second color including ID of the transmitter side visible communication apparatus and ID of the receiver side visible light communication apparatus, when a communication establishment request from the transmitter-side visible communication apparatus is responded to based on information included in visible light received by the light receiving means; and
  and a third control process step for controlling so that the light emitting means emits the visible light of a third color including response information, when transmission data emitted from the transmitter-side visible communication apparatus based on information included in the visible light received by the light receiving means.

17. A visible light communication method according to claim 16, wherein
  when the resending request of the transmission data is carried out based on information included in the visible light received by the light receiving means, a control process step controls so that the light emitting means emits the visible light of a fourth color including information of a resending request.

* * * * *